United States Patent
Ribic

(10) Patent No.: US 7,092,877 B2
(45) Date of Patent: Aug. 15, 2006

(54) METHOD FOR SUPPRESSING NOISE AS WELL AS A METHOD FOR RECOGNIZING VOICE SIGNALS

(75) Inventor: Zlatan Ribic, Vienna (AT)

(73) Assignee: Turk & Turk Electric GmbH, Bergisch-Gladbach (DE)

( * ) Notice: Subject to any disclaimer, the term of this patent is extended or adjusted under 35 U.S.C. 154(b) by 793 days.

(21) Appl. No.: 10/210,641

(22) Filed: Jul. 31, 2002

(65) Prior Publication Data
US 2003/0028374 A1 Feb. 6, 2003

(30) Foreign Application Priority Data

| Jul. 31, 2001 | (DE) | .................. 101 37 395 |
| Aug. 1, 2001 | (DE) | .................. 101 37 685 |
| Aug. 9, 2001 | (DE) | .................. 101 39 309 |

(51) Int. Cl.
G10L 21/00 (2006.01)
G10L 21/02 (2006.01)

(52) U.S. Cl. ...................... 704/228; 704/233
(58) Field of Classification Search ............... 704/228, 704/233
See application file for complete search history.

(56) References Cited

U.S. PATENT DOCUMENTS

| 3,484,556 | A | * | 12/1969 | Flanagan et al. ........... 704/220 |
| 4,182,993 | A | * | 1/1980 | Tyler ........................ 330/279 |
| 4,398,158 | A | * | 8/1983 | Rodgers ................... 330/136 |
| 4,410,764 | A | * | 10/1983 | Werth et al. ............... 704/203 |
| 4,495,643 | A | | 1/1985 | Orban |
| 4,628,529 | A | * | 12/1986 | Borth et al. .............. 381/94.3 |
| 4,630,304 | A | * | 12/1986 | Borth et al. .............. 381/94.3 |
| 4,630,305 | A | * | 12/1986 | Borth et al. .............. 381/94.3 |
| 4,791,672 | A | * | 12/1988 | Nunley et al. .............. 381/317 |
| 4,811,404 | A | * | 3/1989 | Vilmur et al. ............. 381/94.3 |
| 4,984,188 | A | * | 1/1991 | Kato .......................... 708/400 |
| 5,012,519 | A | * | 4/1991 | Adlersberg et al. ......... 704/226 |
| 5,544,250 | A | * | 8/1996 | Urbanski ................... 381/94.3 |
| 5,633,937 | A | * | 5/1997 | Ribic ......................... 381/312 |
| 6,205,225 | B1 | | 3/2001 | Orban |
| 6,426,983 | B1 | * | 7/2002 | Rakib et al. ................ 375/346 |
| 6,622,044 | B1 | * | 9/2003 | Bange et al. ................. 607/27 |
| 6,700,982 | B1 | * | 3/2004 | Geurts et al. ............... 381/312 |

(Continued)

FOREIGN PATENT DOCUMENTS

EP 0 542 710 A1 5/1993

(Continued)

OTHER PUBLICATIONS

Levitt, Harry, "Noise reduction in hearing aids: An overview," Jan./Feb. 2001, Journal of Rehabilitation Research and Development, vol. 38, No. 1, pp. 1-12.*

(Continued)

Primary Examiner—Tālivaldis Ivars Šmits
Assistant Examiner—Eunice Ng
(74) Attorney, Agent, or Firm—Sonnenschein Nath & Rosenthal LLP

(57) ABSTRACT

The invention relates to a method for suppressing noise interference with the following steps:
  Gaining of an analytical signal from an input signal ($S_{in}$);
  Calculation of an instant amplitude signal (IA) from the analytical signal;
  Calculation of an instant phase signal (IFI) from the analytical signal;
  Non-linear modification of the instant amplitude signal (IA) into a modified instant amplitude signal ($IA_{mod}$);
  Linkage of the modified instant amplitude signal ($IA_{mod}$) with the instant phase signal (IFI) into an output signal ($S_{out}$).

27 Claims, 11 Drawing Sheets

U.S. PATENT DOCUMENTS

| | | | |
|---|---|---|---|
| 6,718,301 B1* | 4/2004 | Woods | 704/233 |
| 6,721,711 B1* | 4/2004 | Hoshiai | 704/500 |
| 6,757,395 B1* | 6/2004 | Fang et al. | 381/94.3 |
| 6,920,194 B1* | 7/2005 | Stopler et al. | 375/349 |
| 6,937,978 B1* | 8/2005 | Liu | 704/228 |
| 2003/0046069 A1* | 3/2003 | Vergin | 704/228 |
| 2003/0065509 A1* | 4/2003 | Walker | 704/228 |

FOREIGN PATENT DOCUMENTS

| | | | |
|---|---|---|---|
| EP | 0 542 711 A1 | | 5/1993 |
| WO | WO 8402793 | * | 7/1984 |

OTHER PUBLICATIONS

Boll, Steven. "Suppression of Acoustic Noise in Speech Using Spectral Subtraction," Apr. 1979, IEEE Transactions on Acoustics, Speech, and Signal Processing, vol. 27, Issue 2, pp. 113-120.*

Evangelopoulos et al. "Speech Event Detection using Multiband Modulation Energy," Proceedings of Interspeech Conference (EUROSPEECH-2005), Lisboa, Portugal, 2005.*

Li et al. "Direct Blind Equalization with Best Delay by Channel Output Whitening," IEEE Transactions on Signal Processing, Jul. 2001, vol. 49, No. 7, pp. 1556-1563.*

Fujita et al. "Stochastic evaluation of acoustic environment with noise cancellation under introduction of hierarchically functional type probability model," Feb. 2001, IEICE, vol. E84-A, No. 2, pp. 467-474.*

R.B. Randall "Frequency Analysis", Revised Sep. 1987, pp. 58-75.

S.L. Hahn "Hilbert Transforms in Signal Processing" Artech House, 1996, pp. 3-53.

Proceedings of the IEEE, vol. 67, No. 12, Dec. 1979 entitled Enhancement and Bandwidth Compression of Noisy Speech, by Jae S. Lim and Alan V. Oppenheim, pp. 221-239.

* cited by examiner

Fig.1
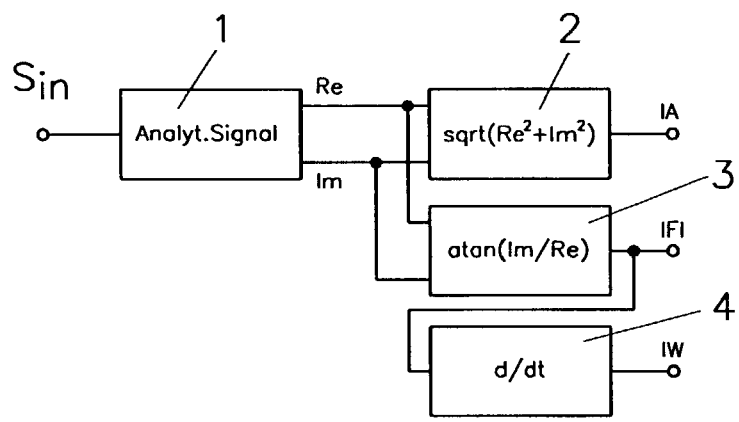
Fig.2
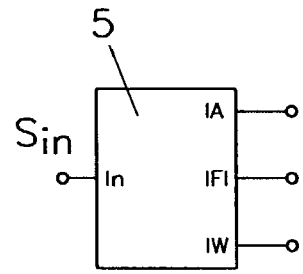
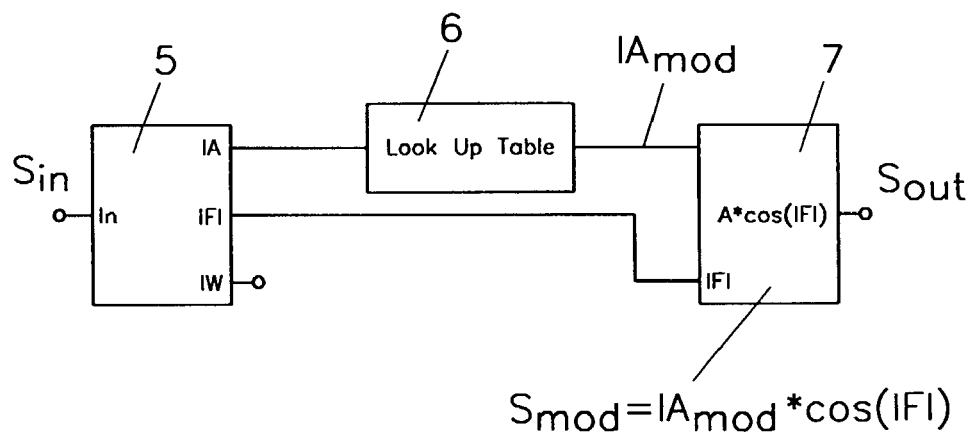
Fig.3

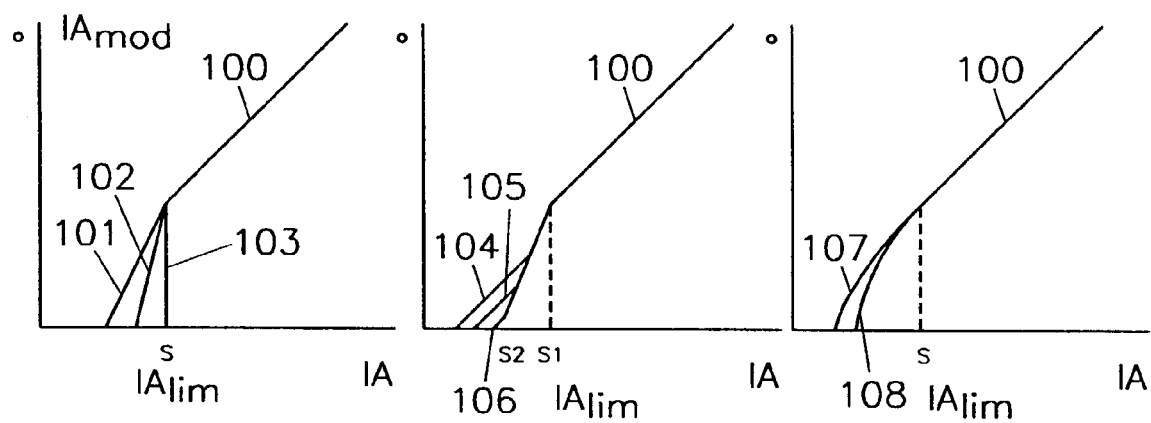
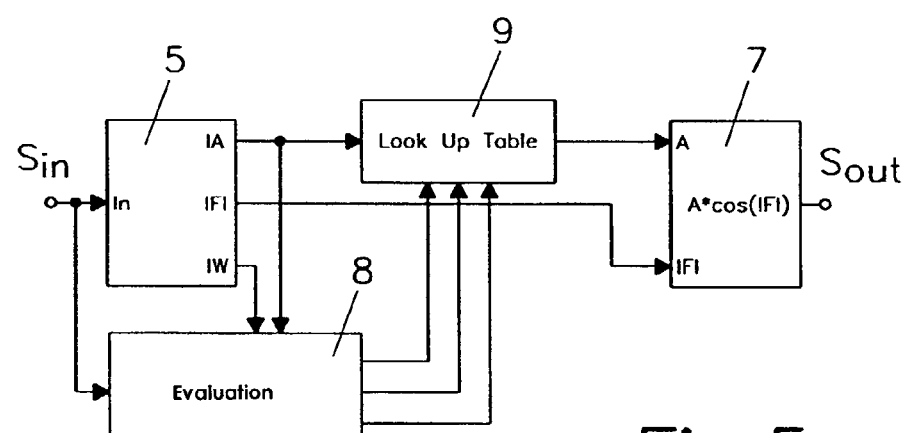

METHOD FOR SUPPRESSING NOISE AS WELL AS A METHOD FOR RECOGNIZING VOICE SIGNALS

BACKGROUND OF THE INVENTION

The invention relates to a method for suppressing noise as well as a method for recognizing voice signals in order to enable the effective elimination of noise from the voice signals.

The development of hearing aids has been perfected in the last years to such an extent that technical problems are virtually excluded or irrelevant. The problem is still urgent, however, to process the signals during the amplification in such a way that the useful signals are transmitted as loss-free as possible and noise signals are suppressed to the highest possible extent.

The suppression of noise is also a relevant topic in other applications such as in the field of signaling via phone lines or radio.

A simple approach consists of attenuating certain frequency ranges in which a high share of noise signals is presumed by using high-pass filters, low-pass filters and band-pass filters. Due to the diversity of possible noise signals, such methods have only a limited use and moreover the useful signals, which is usually a voice signal, is distorted and disturbed.

DESCRIPTION OF PRIOR ART

A further difficulty consists of the fact that speech concerns a highly complex signal. Different models of voice recognition are known such as in J. L. FLANAGAN: "Speech Analysis, Synthesis and Perception" 2. ed, Springer, N.Y. 1972. A basic signal is defined which either consists of a pulse string as is the case in vowels or of noise such as in consonants like "S" or "SH". The pulse string defines the tone pitch and is often designated as F0 (zero formant). Such a signal usually has numerous harmonic components up to very high frequencies. Noise is additionally produced by breathing. The signals thus produced during articulation are filtered further. The spectral form is thus changed and speech is obtained. Deriving from this it has been tried to develop noise suppression systems based on a spectral analysis. Since speech changes continually, meaning that amplitude, frequency and spectra are not constant, such methods are subject to certain limits. Additional difficulties are caused by co-articulations which represent a transition from one to another phoneme. In contrast to this, disturbances are usually relatively simpler signals, which moreover also applies to music.

A principal outline which also applies today has been explained in J. S. LIM, A. V. OPPENHEIM: "Enhancement and Bandwidth compression of noisy speech" Proceedings of IEEE Vol. 67, No. 12, December 1979. Methods such as "beam forming" and "blind source separation" have gained in importance recently. In such methods more than one microphone is needed. The present invention relates to methods which are applicable to signals also gained from only a single microphone.

In practice, so-called "noise gates" are frequently used which principally represent one or several expanders switched in parallel. The input signal is amplified and supplied in parallel to several filters and thus subdivided into several frequency bands. The amplitude is then determined in each channel in such a way that the absolute value is filtered with a low-pass filter in order to thus gain the average energy or amplitude of the signal. This is followed by a non-linear transformation which can also be realized in digital signal processing with a so-called "look up table", but also in a different way such as by a closed stated function. The value thus gained is used to amplify or attenuate the signal of the respective channel, which means that in the simplest case there is merely a multiplication. The signals of each channel gained in this manner are added in order to produce an output signal. An expansion of the signal can then be performed easily in the case that when the energy is low (i.e. the amplitude of the signal is low) the signal is reduced, whereas it is amplified in the case of a higher amplitude. Noise of low amplitude are suppressed in each frequency range. Such systems only work at a relatively constant disturbance. A further problem is that faint voice signals are also suppressed. Furthermore, artifacts are generated in the speech pauses which are sometimes very disturbing. In summary it can be said that such a system cannot offer a satisfactory solution for suppressing noise.

From EP 542 710 A (RIBIC) a method has become known to process signals in which an analytical signal is gained from an input signal. A complex signal is designated as an analytical signal whose imaginary component represents the Hilbert transform of the real component. The mathematical basics have been described in detail for example in R. B. RANDALL: "Frequency Analysis" BRÜL&KJAER, 1987. In the said publication different possibilities and circuits for gaining Hilbert signals are described. As a result of current possibilities of digital signal processing it is relatively easily possible to realize a Hilbert transformer in order to gain the real and imaginary signal. Reference is hereby made for example to S. L. HAHN: "Hilbert Transforms in Signal Processing" Artech House, 1996. Based on the analytical signal consisting of the two Hilbert signals, or the real component and the imaginary component respectively, a so-called instant amplitude signal can be calculated according to the following formula (1):

$$IA=(Re^2+Im^2)^{1/2} \quad (1)$$

with Re designating the real component of the analytical signal and Im the imaginary component of the analytical signal.

The instant amplitude signal represents a value which represents the momentary magnitude. The magnitude is the vector length for complex signals; the amplitude of the input signal is in the time domain of the momentary value of the real component of the analytical signal. An instant phase signal is calculated according to the following formula (2) in an analogous manner:

$$IFI=\arctan(Im/Re) \quad (2)$$

with IFI representing a value which can be regarded as the momentary phase of the signal.

A method is known from the aforementioned EP 542 711 A with which audio signals can be processed in order to improve the performance of hearing aids. An analytical signal is produced from the input signal from which an instant amplitude signal is calculated. Said instant amplitude signal is used as a correcting variable in order to suitably amplify the input signal or one of the Hilbert signals, so that a signal compression is achieved. The instant amplitude signal is only used for processing the input signal in a respective manner. Since the delay of the instant amplitude signal and the signal thereby controlled are not in agreement, a completely satisfactory solution cannot be achieved.

The U.S. Pat. No. 4,495,643 (ORBAN) and the U.S. Pat. No. 6,205,225 (ORBAN) show methods which produce at first an analytical signal by a Hilbert transformation. In the above circuits the Hilbert signals are filtered before further processing, so that a real instant amplitude signal cannot be obtained. It is possible with such methods to limit signal peaks. It is not possible, however, to effectively suppress noise in its entirety.

SUMMARY OF THE INVENTION

It is the object of the present invention to provide a method of the kind described above with which noise can be effectively suppressed. In particular, such a method that allows an easy adjustability and adaptability to a large variety of ambient conditions. In the case of hearing aids it is also intended to consider the specific hearing loss of the respective person.

It is a further object of the present invention to emphasize the harmonic shares of the input signals in which there is in many situations a low share of noise.

It is also an object of the present invention to provide a method for voice recognition so that subsequently noise can be effectively suppressed.

In a first embodiment of the invention the following steps are performed:

Gaining of an analytical signal from an input signal;
Calculation of an instant amplitude signal from the analytical signal;
Calculation of an instant phase signal from the analytical signal;
Non-linear modification of the instant amplitude signal into a modified instant amplitude signal;
Linkage of the modified instant amplitude signal with the instant phase signal into an output signal.

The relevant aspect in the present invention is that the instant amplitude signal is not used as in the state of the art merely for controlling or processing the input signal. Instead, the amplitude signal per se is modified and is combined with an instant phase signal into an output signal. A further relevant aspect is that the composed signals are provided with the same delays, so that distortions can be minimized.

The solution in accordance with the invention provides special advantages over the state of the art when the analytical signal is produced by two all-pass filters. In the known solutions phase distortions are produced in this case which lead to incorrect results. The synthesis in accordance with the invention is also advantageous for the system integration in which several methods are integrated in a circuit or algorithm.

The output signal $S_{out}$ is calculated according to the following formula (3):

$$S_{out} = IA_{mod} \cdot \cos(IFI) \quad (3)$$

with $IA_{mod}$ as modified instant amplitude signal and IFI as instant phase signal.

Principally, it is possible to achieve both a compression as well as an expansion with the above method. It is preferable, however, if the non-linear modification of the instant amplitude signal is configured as an expansion at least in the lower level range, i.e. low levels are amplified or attenuated to a sub-proportional extent. In this way it is possible to effectively suppress faint disturbances in speech pauses. The relevant advantage of the method in accordance with the invention is that an immediate response characteristic is achieved as compared with conventional automatic controls which always require a certain transient recovery and decay time. This represents a relevant advantage of the invention.

It is clear that with a fixedly set modification of the instant amplitude signal it is possible to ensure an optimal adjustment only to predetermined ambient states. An adaptive control which allows adjustment to a variety of ambient states can be achieved when the non-linear modification of the instant amplitude signal is performed as a result of an evaluation of the input signal. This means that the input signal is analyzed and as a result of this analysis the kind of modification of the instant amplitude signal is changed. The evaluation will be made in the manner for example that it is found out first whether or not there is a voice signal and what nature the possible noise signal has. Depending on this analysis the modification of the instant amplitude signal is performed. In the absence of a voice signal for example, however, an attenuation is generally performed. Contrarily, in the presence of a voice signal in the manner of the present disturbance a respective processing is provided.

An especially quick and reliable evaluation can be achieved when the evaluation is performed as a result of an evaluation function which is calculated from the instant amplitude signal and an instant frequency signal gained by temporal differentiation of the instant phase signal in order to obtain an evaluation index. The basic idea is that speech in its capacity as a useful signal contains certain harmonic structures which can be used for differentiating between voice signals and noise signals. It was noticed in this respect that voice signals have a relatively high correlation of the instant amplitude signal formed in accordance with the invention with the instant frequency signal. An evaluation function can be derived therefrom which supplies an evaluation index which allows a statement on the presence of useful signals (voice and noise signals). In the simplest case the evaluation index can provide merely two values such as 0 and 1 which stand for noise signal or voice signal. In more refined arrangements it is possible to provide several output values to the evaluation index or to define a continuous value range between 0 and 1, with the value of the evaluation index stating the probability of the presence of voice signals or noise signals or representing a measure for the share of the respective signal components in the case of mixed signals. The temporal derivation of the phase signal IFI is precisely a radian frequency signal IW which produces the actual frequency signal IFR after division by $2\pi$.

A particularly simple performance of the method can be obtained when the following steps are performed:

Non-linear modification of the instant amplitude signal into a modified instant amplitude signal;
Non-linear modification of the instant frequency signal into a modified instant frequency signal;
Calculation of the evaluation function from the ratio of the modified instant amplitude signal to the modified instant frequency signal in order to obtain the evaluation index.

As a result of the high correlation of IA and IW in voice signals the ratio IA/IW will move in such signals within a relatively narrow range. If the ratio is substantially smaller or substantially larger, it can be deduced therefrom that a noise signal dominates. The evaluation index n can be calculated analytically according to a formula $n = \exp(-(k - IA/IW)^2)$ for example, with an empirically determined proportionality factor k, with n=1 meaning exact proportionality (i.e. voice signal) and n<<1 no voice signal.

As a result of the non-linear modifications of the instant amplitude signal and the instant frequency signal it is possible to obtain a sharper differentiation.

A further sharpening of the differentiation can be gained when not only the ratio of IA to IW but also the ratio of the temporal derivatives of these signals is considered, because in the case of voice signals the derivatives are also correlated with each other. The evaluation index will have a high value in cases when both the correlation of the signals per se as well as the correlation of their derivations is given. For this purpose the respective partial evaluation indexes are additively linked. It is possible in this process to weight the one or other partial evaluation function more strongly in the summary formation. The respective weightings can be determined easily by trials according to the respectively prevailing conditions. It is generally advantageous to weight differentiated signals more strongly by multiplying for example the first partial evaluation index with w and the second partial evaluation index with (1−w). The value w can be between 0.2 and 0.4 for example.

A particularly preferable embodiment of the invention is given when a characteristic diagram is used for the evaluation. It has been surprisingly seen that a characteristic diagram in which the probability density of the occurrence of certain combinations of instant amplitude signal and instant frequency signal is represented shows a characteristic form for speech in contrast to other signals. The characteristic diagram breaks down at first in a principal way into a range of positive values of instant frequency and in a range of negative instant frequency. Only the first range is relevant for the evaluation. It has surprisingly been noticed that there are two local maximums in the positive range of which on is simultaneously the absolute maximum. The probability density thus shows a two-peak structure. Interestingly, this structure is substantially independent of the spoken language and the speaking person. On the basis of this finding it is possible to conclude from the characteristic diagram the presence or non-presence of speech.

In order to increase the selectivity it is advantageous when the input signal is normalized at first with respect to amplitude. This occurs in the known manner with an AVC element with a relatively long time constant, which ensures that the average level of the amplitude is substantially constant on the average. This process is also known as slow compression. In respect to speech, the vowels tend to be suppressed, whereas the consonants are amplified.

In a short-term respect there is a proportionality between the instant amplitude and the instant frequency, as is described above. The proportionality factor is changeable in the progress over time.

A particularly favorable embodiment of the method is given when the following steps are performed:

Gaining of an analytical signal from an input signal;

Calculation of an instant amplitude signal from the analytical signal;

Calculation of an instant phase signal from the analytical signal;

Formation of an integrated instant amplitude signal as a temporal mean value of the instant amplitude signal;

Formation of an integrated instant phase signal, with a temporal derivation of the instant phase signal being formed and the result being temporally averaged and integrated;

Formation of a delayed instant amplitude signal by delaying the instant amplitude signal by a delay time which corresponds to the delay by the mean value formation of the instant amplitude signal;

Formation of a delayed instant phase signal by delaying the instant phase signal by a delay time which corresponds to the delay by the mean value formation of the instant phase signal;

Linkage of the integrated instant amplitude signal with the integrated instant phase signal into an integrated output signal;

Linkage of the delayed instant amplitude signal with the delayed instant phase signal into a delayed output signal;

Linkage of the integrated output signal with the delayed output signal.

It is thus especially possible to effectively suppress relatively static, narrow-band noises. In principle, it would be possible to also delay the original signal directly instead of the delay of IA and IFI. This would lead to the disadvantages as explained above, especially when using all-pass filters for producing the analytical signal. Moreover, Hilbert transforms are never perfect because they are not causative. In the case of a theoretically perfect transformer, the necessary delay would be indefinitely long, which is useless in practice. Therefore, it is advisable to perform the delay in the range of the complex amplitude and frequency. Then the errors of the Hilbert transformation are the same for both signals and compensate themselves substantially.

This method is particularly well suited to filter out a relatively constant noise signal. Preferably, the following formula (4) is used:

$$S_{out}=S_{del}-n \cdot S_{int} \qquad (4)$$

The factor n lies between 0 and 1 determines the extent to which the static component is attenuated in order to obtain the dynamic component as output signal. It was noticed that in this way it is possible to also effectively filter out interference which is substantially larger than the useful signal itself. For this purpose it is necessary to choose the factor n relatively large, i.e. that this factor lies close to 1. In the case that there is a very minute interference, the useful signal itself is distorted in an undesirable manner. This problem can be solved by the stated measure in a very simple way because it has been noticed that the ratio of signal strength of the integrated output signal to the delayed output signal is a very good measure as to how large the undesirable static component is.

A further embodiment of the invention provides performing the following steps:

Gaining of an analytical signal from an input signal containing noise;

Calculation of an instant phase signal from the analytical signal;

Calculation of an instant frequency signal as a temporal derivation of the instant phase signal divided by $2\pi$;

Formation of a single delayed signal by delaying a signal from the group containing the input signal and the signals derived therefrom in order to obtain a duration corresponding to the reciprocal value of a single integral multiple of the instant frequency signal;

Formation of a signal mean value from the signal and the single delayed signal in order to obtain an output signal in which the noise is suppressed.

Such a method allows very easily recognizing and amplifying harmonic series. The duration corresponding to the reciprocal value of the instant frequency signal is the momentary period of oscillation. The signal which is delayed can be the input signal itself or it may concern signals which are derived from the input signal such as the instant amplitude signal and the instant phase signal.

In the simplest of cases, the signal in general or the instant amplitude signal and the instant phase signal in particular are delayed by precisely this duration. This ensures that a signal which primarily consists of a fundamental tone and upper harmonics shows a very high correlation between the instant amplitude signal and the delayed instant amplitude signal and a similarly high correlation between the instant phase signal and the delayed instant phase signal. A positive interference is thus achieved by the formation of the amplitude mean value and the phase mean value. Such a correlation is not present for other non-harmonic signals, so that there is an attenuation from a relative viewpoint by the formation of the mean value. In this way voice signals which substantially consist of harmonic signals are amplified in a preferable fashion.

It is possible to switch several delay elements behind one another and thus increase selectivity. When using a single delay element the harmonic signals, which means such for which the high correlation is present, are amplified by the addition by the factor 2. For non-correlated signals the factor corresponds only to the root of 2, so that the signal-to-noise ratio improves by 3 dB in the case of single delay. If four delay elements are switched behind each other, an improvement by 12 dB is achieved.

A summation in the manner of a sliding average can be achieved when the amplitude mean value is gained in that the single delayed instant amplitude signal which is multiplied with a constant factor is added to the instant amplitude signal and that the phase mean value is gained in that the single delayed instant phase signal which is multiplied with a constant factor is added to the instant phase signal. Depending on the choice of the constant factor k, a higher or lower selectivity is achieved. In this respect, k<1 applies, with a higher value of k corresponding to a higher number of delay elements in the above embodiment.

The value of k or the number of delay elements is upwardly limited because voice signals are not precisely harmonic and every period differs from the preceding or following one in a slight way. The differences become larger the further periods are apart. For the same reason a slight averaging can lead to an improvement in the sound quality.

In the embodiments, all harmonics of the input signals are amplified, which is usually desirable. As an alternative, however, it is also possible to use merely half the period for the delay. If in this case the delayed signal is added to the non-delayed signal, the frequencies IW, 3 IW, 5 IW, etc. are suppressed and the other harmonics are amplified. The effect thus corresponds to a comb filter. Although even the first harmonic is extinguished, voice signals can be understood very well. Alternatively, the delayed signal can be subtracted from the non-delayed signal, which leads to zeros in the frequencies 2 IW, 4 IW, 6 IW, etc.

Voice signals generally show strong harmonic components, but also noise shares. Conversely, interfering signals generally comprise large shares of noise, whereby certain machine noise can comprise harmonic components. In order to avoid amplifying harmonic interfering signals in an undesirable manner during speech pauses, voice recognition can be performed which controls signal processing. By utilizing these findings the following steps are preferably performed:

Gaining of an analytical signal from an input signal;
Calculation of an instant amplitude signal from the analytical signal;
Calculation of an instant phase signal from the analytical signal;
Calculation of an instant frequency signal from the temporal derivation of the instant phase signal;
Calculation of an evaluation function from the instant amplitude signal and the instant frequency signal in order to obtain an evaluation index.

The principal idea is that speech in its capacity as a useful signal comprises certain harmonic structures which can be used for the differentiation between voice signals and interfering signals. It was noticed that voice signals have a relatively high correlation of the instant amplitude signal formed in accordance with the invention to the instant frequency signal. An evaluation function can be derived therefrom which supplies an evaluation index which allows a statement on the presence of useful signals (voice and interfering signals). In the simplest of cases the evaluation index can state merely two values such as 0 and 1 which stands for interfering signal or voice signal, respectively. In refined embodiments it is possible to provide several output values to the evaluation index or to define a continuous value range of between 0 and 1 for example, with the value of the evaluation index stating the probability of the presence of voice signals or interfering signals or representing a measure for the share of the respective signal components in the case of mixed signals. The temporal derivation of the phase signal IFI is precisely a radian frequency signal IW which after the division by $2\pi$ produces the actual frequency signal IFR.

A further sharpening of the differentiation can be gained when not only the ratio of IA to IW but also the ratio of the temporal derivatives of said signals is taken into account, because the derivatives are also correlated with each other in voice signals. The evaluation index will then have a high value when both the correlation of the signals per se as well as the correlation of their derivatives are given. For this purpose the respective partial evaluation indexes are additively linked. It is possible to weight the one or other partial evaluation function more strongly in the summation. Respective weightings can be determined easily by trials according to the respectively prevailing conditions. It is generally advantageous to weight the differentiated signals more strongly by multiplying the first partial evaluation index with w for example and the second partial evaluation index with (1−w). The value w can be between 0.2 and 0.4 for example.

BRIEF DESCRIPTION OF THE DRAWINGS

The present invention is explained in closer detail by reference to the embodiments shown in the drawings, wherein:

FIGS. 1 and 2 show block diagrams of circuits which are used in the present invention;

FIG. 3 shows a block diagram of a simple apparatus for suppressing noise;

FIGS. 4a, 4b, 4c show diagrams which explain the expansion of signals;

FIGS. 5, 6 and 7 show block diagrams of further apparatuses for suppressing noise;

DETAILED DESCRIPTION OF THE PREFERRED EMBODIMENTS

Figure 6:
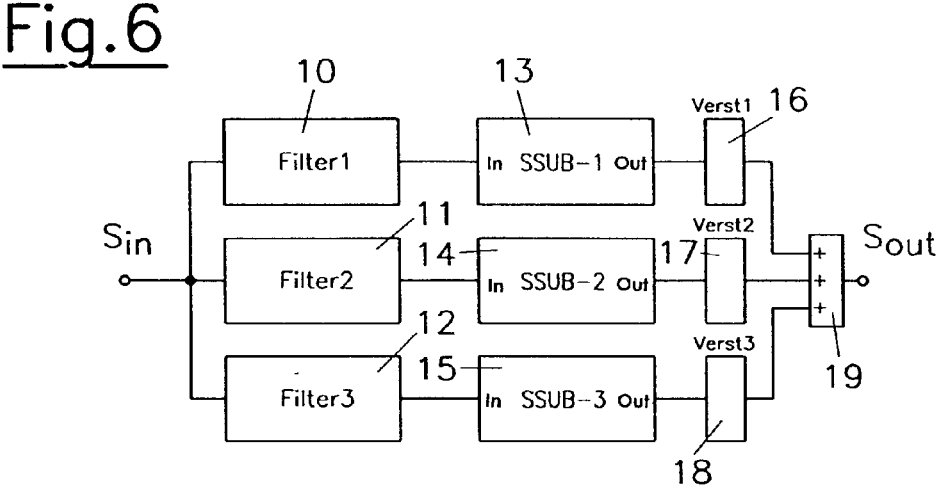

FIG. 1 shows a general circuit in which an instant amplitude signal IA, an instant phase signal IFI and an instant radian frequency signal IW are gained from an input signal. In a first block 1 the input signal $S_{in}$ is converted into an analytical signal which consists of a real component Re and an imaginary component Im. Since the real component and the imaginary component show a constant phase difference of $\pi/2$, the imaginary component Im represents the Hilbert transform of the real component Re. These signals Re and Im are thus also called Hilbert signals. Possibilities for gaining the analytical signal have been described in EP 542 710 A. Substantially, the input signal $S_{in}$ can be subjected to a Hilbert transformation in order to obtain the imaginary component Im. Since the Hilbert transformation entails a delay, the input signal $S_{in}$ also needs to be delayed in order to obtain the real component Re. An alternative possibility is converting the input signal $S_{in}$ by two different all-pass filters into two Hilbert signals. A further possibility for obtaining the analytical signal is obtaining a complex spectrum of the input signal $S_{in}$ by a Fourier transformation, displacing all lines by $\pi/2$ and to reset the signal back to the time domain by inverse transformation. As a result of the possibilities of digital signal processing it is unproblematic to obtain such an analytical signal in a suitable manner. The instant amplitude signal IA and the instant phase signal IFI are obtained in the blocks 2 and 3 according to the above formulas (1) and (2). The instant radian frequency signal IW can be formed by temporal derivation of the instant phase signal IFI in block 4. Notice must be taken that the signals IA, IFI and IW, apart from the delay by the Hilbert transformation, are real-time parameters which are free of any averagings or delays. The instant amplitude IA is always non-negative, whereas the instant radian frequency signal IW is not necessarily positive. Since the instant phase signal essentially defines an angle, it can be limited by so-called wrapping to a range of between 0 and $2\pi$ or to a range of between $-\pi$ and $\pi$.

In FIG. 2 the individual processing steps of FIG. 1 are combined into a single block 5 in order to simplify the further illustration.

Interference of low amplitude can be suppressed generally by a circuit according to FIG. 3. The instant amplitude signal IA of block 5 is subjected in a look up table to a non-linear modification, as a result of which a modified instant amplitude signal $IA_{mod}$ is produced. Instead of a look up table it is also possible to use a closed stated function or the like for producing $IA_{mod}$. In a logic circuit 7, the output signal $S_{out}$ is calculated from the modified instant amplitude signal $IA_{mod}$ and the instant phase signal IFI from the formula (3) as described above.

FIGS. 4a, 4b and 4c show three different variations as to how the instant amplitude signal IA can be converted by non-linear transformation into the modified instant amplitude signal $IA_{mod}$.

In all three diagrams there is a direct proportionality between $IA_{mod}$ and IA above a predetermined limit value $IA_{lim}$ of the instant amplitude signal IA. Below said limit value $IA_{lim}$ $IA_{mod}$ is smaller than corresponds to proportionality. In the embodiment of FIG. 4a a relationship between $IA_{mod}$ and IA is given through straight curve sections 101, 102, 103, with curve section 101 meaning the lowest attenuation, whereas the curve section 103 means that $IA_{mod}$ is set to zero for values below $IA_{lim}$. In the embodiment of FIG. 4b there is a transition range directly below $IA_{lim}$ and adjacent thereto curve sections 104, 105, 106 which are parallel to the proportional range 100. In the embodiment of FIG. 4c the proportional range 100 below $IA_{lim}$ continues in curves 107, 108 which show a stronger ascent. The representations in FIGS. 4a, 4b, 4c are schematic and the illustrated curves can also be applied to a logarithmic representation of $IA_{mod}$ or IA in order to obtain a conventional dB scale.

FIG. 5 shows an extended embodiment based on the solution of FIG. 3, with the non-linear processing of the instant amplitude signal IA being modified depending on an evaluation of the input signal $S_{in}$ in block 8. The result of the evaluation block 8 is supplied as a control signal of the look up table 9. The output signal $S_{out}$ is formed as above previously in block 7 of $IA_{mod}$ and IFI.

FIG. 6 shows a three-channel solution in which the input signal $S_{in}$ is divided into three different frequency bands by a high-pass filter 10, a band-pass filter 11 and a low-pass filter 12, which frequency bands are further processed in separate channels. Alternatively, three or more band-pass filters can be used in order to represent any random number of channels. With 13, 14, 15 signal processing circuits are associated to each channel which correspond to the embodiment of FIG. 3 or of FIG. 5. Amplifiers 16, 17, 18 amplify the signals of each channel and in an adder 19 the signals of the individual channels are added up into an output signal $S_{out}$. The improvement of the circuit of FIG. 6 as compared with the previously described circuits is that instead of a broad-band and frequency-independent closed-loop control there is a selective closed-loop control in individual frequency ranges. In this way the so-called breathing of the closed-loop control in the individual frequency ranges can be suppressed, which may cause disturbances in practical operation. Moreover, there is in hearing aids an improved adjustment possibility to the specific hearing loss.

Figure 7:
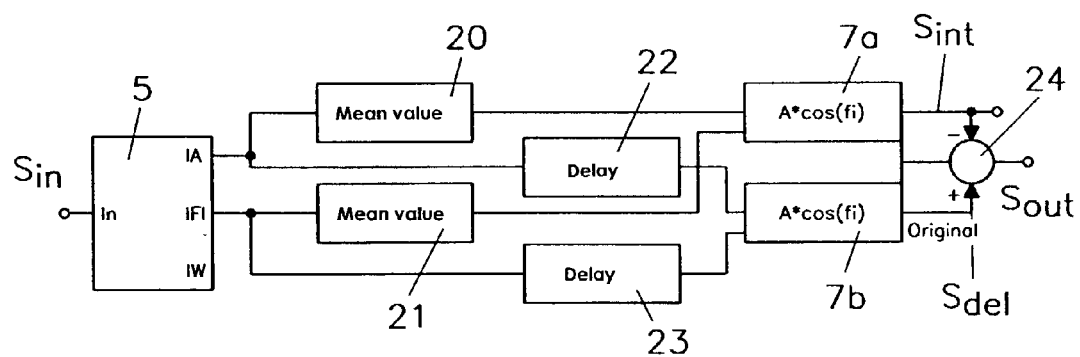

The circuit of FIG. 7 is especially designed to suppress narrow-band interference. In the blocks 20 and 21 the instant amplitude signal IA or the instant phase signal IFI is subjected at first in the frequency domain to a temporal averaging and thereafter integrated. This can simply occur in the case of digital signal processing in such a way that the signals IA and IFI are averaged at the current time t and at the times t−1, t−2 . . . t−k that are directly back to k in order to obtain the integrated instant amplitude signal $IA_{int}$ and the integrated instant phase signal $IFI_{int}$. In block 7a the signals are composed into an integrated output signal $S_{int}$ according to the following formula (3a).

$$S_{int} = IA_{int} \cdot \cos(IFI_{int}) \quad (3a)$$

In parallel thereto the instant amplitude signal IA and the instant phase signal IFI are delayed in the blocks 22 and 23 by a duration which corresponds to the delay which is caused by the mean value formation in the blocks 20 and 21. In the case of the averaging as described above, the delay is k/2. In this way the delayed instant amplitude signal $IA_{del}$ and the delayed instant phase signal $IFI_{del}$ are formed.

In block 7b said signals are composed according to the following formula (3b) into a delayed output signal $S_{del}$.

$$S_{del}=IA_{del}\cos(IFI_{del}) \quad (3b)$$

In a subtraction element 24, the integrated output signal $S_{int}$ is subtracted in full or in part from the delayed output signal $S_{del}$ in order to obtain the output signal $S_{out}$ which in this way is representative of the dynamic component of the input signal $S_{in}$.

The circuit of FIG. 7 allows successfully filtering out relatively constant narrow-band interference, i.e. interfering signals whose frequency and amplitude change only slowly. It is certainly possible in this case that the interfering signal is substantially larger than the useful signal.

It has been seen that the length k of the time window through which the average value formation occurs is critical for the quality of the signal processing. That is why digital signal processing according to the algorithm as explained above shows substantial advantages as compared with an analog circuit with filters, because the value of k can be adjusted easily to the respective conditions.

Figure 8:
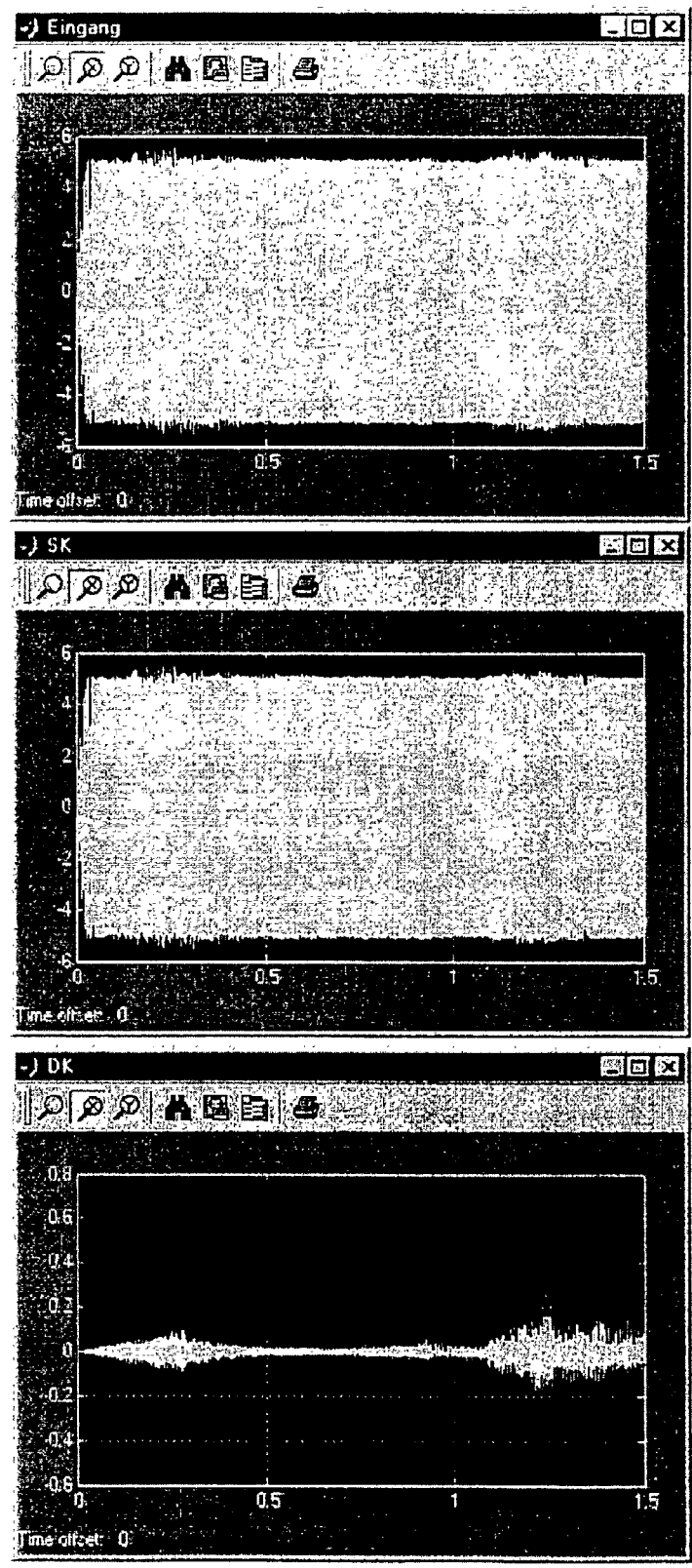
FIG. 8 shows various diagrams showing the effectiveness in suppressing noise.

FIG. 8 shows the effectiveness of the circuit according to FIG. 7. The diagrams of FIG. 8 each show signals for a time section of 1.5 seconds. The upper diagram shows an input signal $S_{in}$ which is composed of a useful signal, namely music, with an amplitude of approx. 0.1 and an interfering signal, namely a wobbled sound with an amplitude of 5. The interference is thus approx. 34 dB larger than the useful signal. The middle diagram shows the integrated output signal $S_{int}$ which is representative of the isolated interference. The lower diagram shows the output signal $S_{out}$ which is formed from the difference of the delayed output signal $S_{del}$ and the integrated output signal $S_{int}$.

Figure 9:
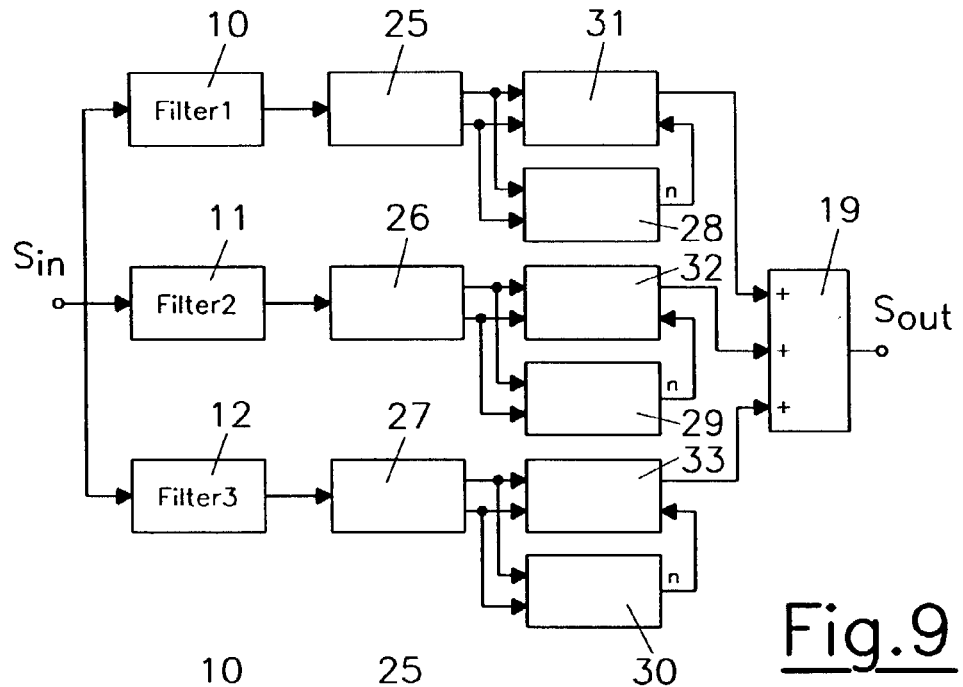
FIGS. 9 and 10 show further block diagrams of apparatuses for suppressing noise.

FIG. 9 shows a three-channel circuit which as compared with the one of FIG. 7 comes with two essential advantages. On the one hand, the input signal $S_{in}$ is subdivided as in FIG. 6 by a high-pass filter 10, a band-pass filter 11 and a low-pass filter 12 into three different frequency bands which are further processed in separate channels. Blocks are designated in FIG. 9 with 25, 26, 27 which each correspond to a circuit of FIG. 7 with the exception of the subtraction element 24. The delayed output signal $S_{del}$ and the integrated output signal $S_{int}$ is applied to each of the outputs of said blocks 25, 26, 27 for each frequency range. This allows optimally filtering out up to three mutually independent quasi-static interferences. It is obvious that the number of channels can be chosen at will depending on the demand and the available calculation power.

A further difference of the embodiment of FIG. 9 to the solution as described above is that in the evaluation elements 28, 29, 30 the signals $S_{del}$ and $S_{int}$ are analyzed for each frequency range. It was noticed that the circuit of FIG. 7 offers very good results when there is actually a considerable interference. In the case of undisturbed input signals however a static share is also filter out, which leads to undesirable distortions. It is tried in the evaluation elements 28, 29, 30 to detect the extent of the interference in order to avoid any overshooting correction. In the simplest case the ratio between the delayed output signal $S_{del}$ and the integrated output signal $S_{int}$ is substantially determined for each frequency range. This can occur according to the following formula (6) for example:

$$n=f(MAS_{int}/(MAS_{del}-MAS_{int})) \quad (6)$$

$MAS_{int}$ as an averaged absolute value of $S_{int}$ represents the static component and $(MAS_{del}-MAS_{int})$ the dynamic component in the respective channel, with $MAS_{del}$ designating the averaged absolute value of $S_{del}$. An evaluation index is calculated with the evaluation function f which is realized by a look up table, which index is between 0 and 1. The larger the static component $MAS_{int}$ is in comparison with the dynamic component $(MAS_{del}-MAS_{int})$, the closer n is to 1. Conversely, n is determined with zero for values of the ratio $(MAS_{int}/(MAS_{del}-MAS_{int}))$ below a predetermined limit value. The evaluation function f can be optimized empirically.

With the evaluation index n thus determined, which is designated for the first channel with $n_a$, it is possible to calculate an output signal in the subtraction elements 31, 32, 33 for each channel. The formula is as follows based on the example of the first channel:

$$S_{out1}=S_{del}-n_a \cdot S_{int} \quad (7)$$

This formula (7) shows that the correction is higher the larger the static component. In this way distortions can be minimized and the production of artifacts can be avoided.

In analogy to the circuit of FIG. 6, the signals of the individual channels are added up in an adder 19 into an output signal $S_{out}$.

Figure 10:
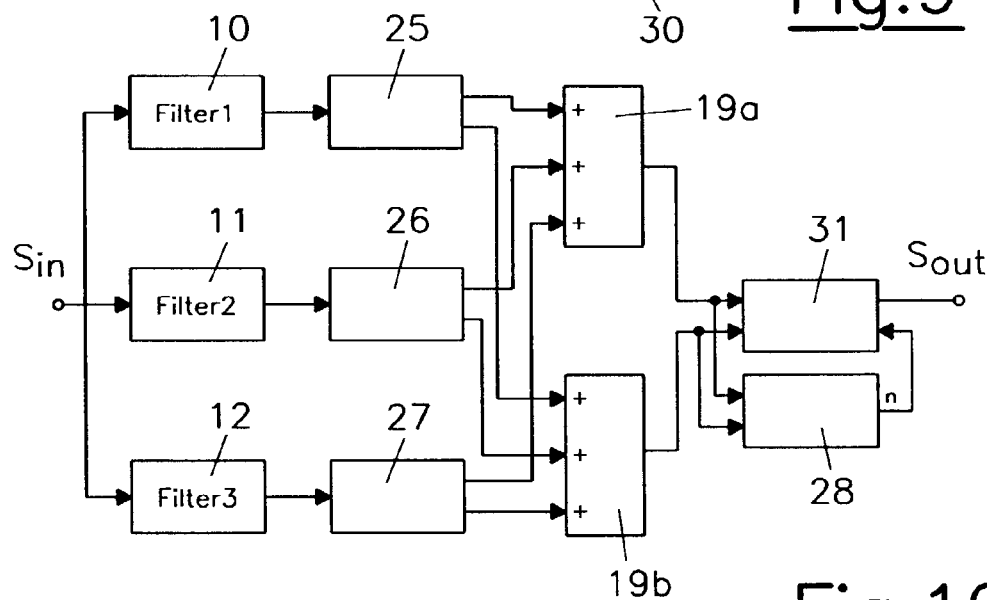

FIG. 10 shows a circuit which corresponds substantially to that of FIG. 9. Accordingly, only the differences will be explained. In this embodiment the delayed output signals $S_{del}$ and the integrated output signals $S_{int}$ of all channels are added in the adders 19a and 19b. In this way a delayed output signal $S_{del}$ and an integrated output signal $S_{int}$ is obtained for all channels. The calculation according to the formula (6) is carried in the evaluation element 28 as described above and the determination of the output signal $S_{out}$ occurs in the subtraction element 31 according to formula (7).

Such a circuit has a simpler arrangement and requires less processing power than the one of FIG. 9. The differentiation between useful signal and interference is not as precise, however.

A method for recognizing speech can be performed alternatively or additionally in the evaluation elements 28, 29, 30, as is described below.

Figure 11:
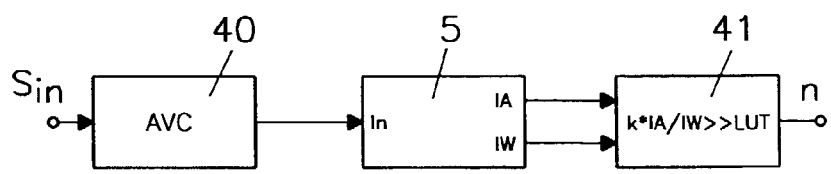
FIGS. 11 and 12 show block diagrams of circuits for recognizing voice signals.

FIG. 11 shows in a general form a circuit for recognizing interfering signals. A standardization of the amplitude is performed in block 40. The time constants should be relatively long. As a result of standardization the fact is compensated that the level of the input signals differ substantially depending on the distance to the speaker, which impairs the correlation which will be described below. As a result of the relatively long time constant the dynamics of the speech is maintained and interference during shorter speech pauses are not overstressed.

Block 5 supplies an instant amplitude signal IA, an instant phase signal IFI and an instant radian frequency signal IW, as has been described in connection with FIGS. 1 and 2. The instant frequency signal IFR is calculated in block 41 from the instant radian frequency signal IW by division by $2\pi$. An evaluation index is calculated therefrom and the instant amplitude signal IA from an evaluation function. The recognition of speech as a useful signal as well as music to a lesser extent is based on the fact that in the presence of harmonic components one can observe a correlation between the instant amplitude signal IA and the instant frequency signal IFR. Such a correlation is surprisingly also occasionally present to a lesser extent in harmonic signals, but not at all in noise.

In the simplest of cases the ratio of the instant amplitude signal IA and the instant frequency signal IFR is used as a variable for the evaluation function. It is also possible to perform a non-linear transformation prior to forming the ratio in order to obtain a modified instant amplitude signal $IA_{mod}$ or a modified instant frequency signal $IFR_{mod}$:

$$IA_{mod}=f(IA) \tag{8}$$

$$IFR_{mod}=g(IFR) \tag{9}$$

The evaluation functions f and g are non-linear, preferably monotonous functions such as $\ln(x)$ or $x^3$, but are generally realized by look up tables which are determined empirically. For this purpose signals are generated which comprise interferences of different types and different voice shares and are analyzed according to FIG. 11. By varying f and g, the correlation of the evaluation index n with the actual voice share can be optimized. The input quantity of the evaluation function is $IA_{mod}/IFR_{mod}$ in this case.

Figure 12:
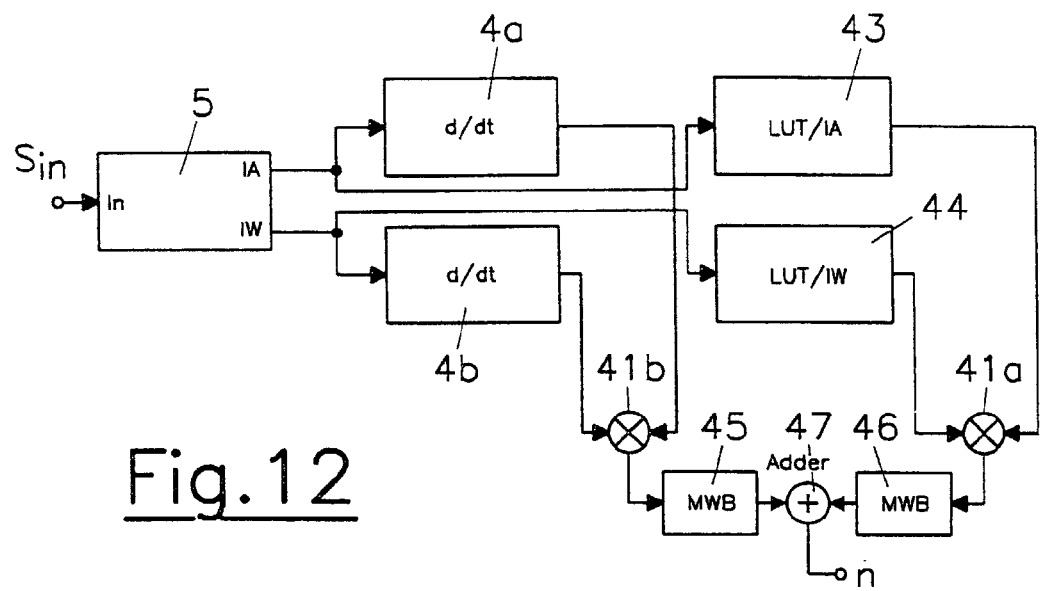

An improved recognition is enabled by the circuit according to FIG. 12 in which not only the correlation between the instant amplitude signal IA and the instant frequency signal IFR or a quantity which is similar thereto is considered in order to obtain a first partial evaluation index $n_1$, but also the correlation between the temporal derivatives $IA_{diff}$ or $IFR_{diff}$ of these quantities which are formed in the differentiators 4a, 4b.

As described above, a non-linear transformation is performed in blocks 43 and 44 in order to obtain a modified instant amplitude signal $IA_{mod}$ and a modified instant frequency signal $IFR_{mod}$. Not outlined (but still possible) is a non-linear transformation of the temporal derivatives $IA_{diff}$ and $IFR_{diff}$ to modified derivatives $IA_{diffmod}$ and $IFR_{diffmod}$.

A first partial evaluation index is obtained in such a way that in block 41a, which is substantially a multiplier, the modified instant amplitude signal $IA_{mod}$ and the modified instant frequency signal $IFR_{mod}$ are multiplied with each other. When the non-linear transformations are performed in the blocks 43 and 44 in such a way that $IA_{mod}$ and $IFR_{mod}$ fluctuate about the zero point then the product is large at high correlation, otherwise small.

In block 41b, a second partial evaluation function is calculated analogously from the derivations in order to obtain a second partial evaluation index $n_2$.

Block 41 works as described above. A temporal mean value formation is performed in blocks 45 and 46 in order to compensate slight phase differences between the signals which impair the correlation. As a result, a cross correlation calculation is performed.

The outputs of blocks 45 and 46 are added in an adder 47. A weighting may optionally be performed in order to obtain the final evaluation index n. It is advantageous in this embodiment that the blocks 41, 43 and 44 on the one hand and 42 on the other hand can be optimized separately from one another, which facilitates the determination of the functions and coefficients.

Figure 13:
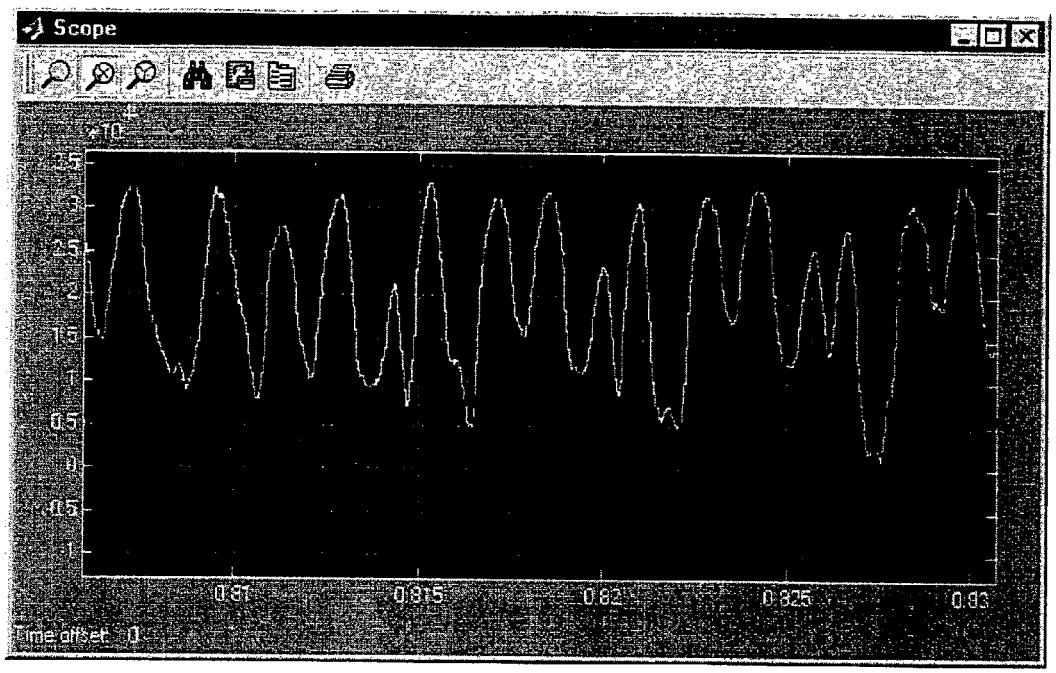
FIGS. 13 and 14 show diagrams which explain the effect of circuits for recognizing voice signals.

IA and IFR are entered in FIG. 13 for a signal which consists primarily of speech. The instant amplitude signal IA is illustrated in a strongly amplified way in the upper range as a bright curve. Below the instant frequency signal IFR is entered as a dark curve. The correlation between these signals is obvious.

Figure 14:
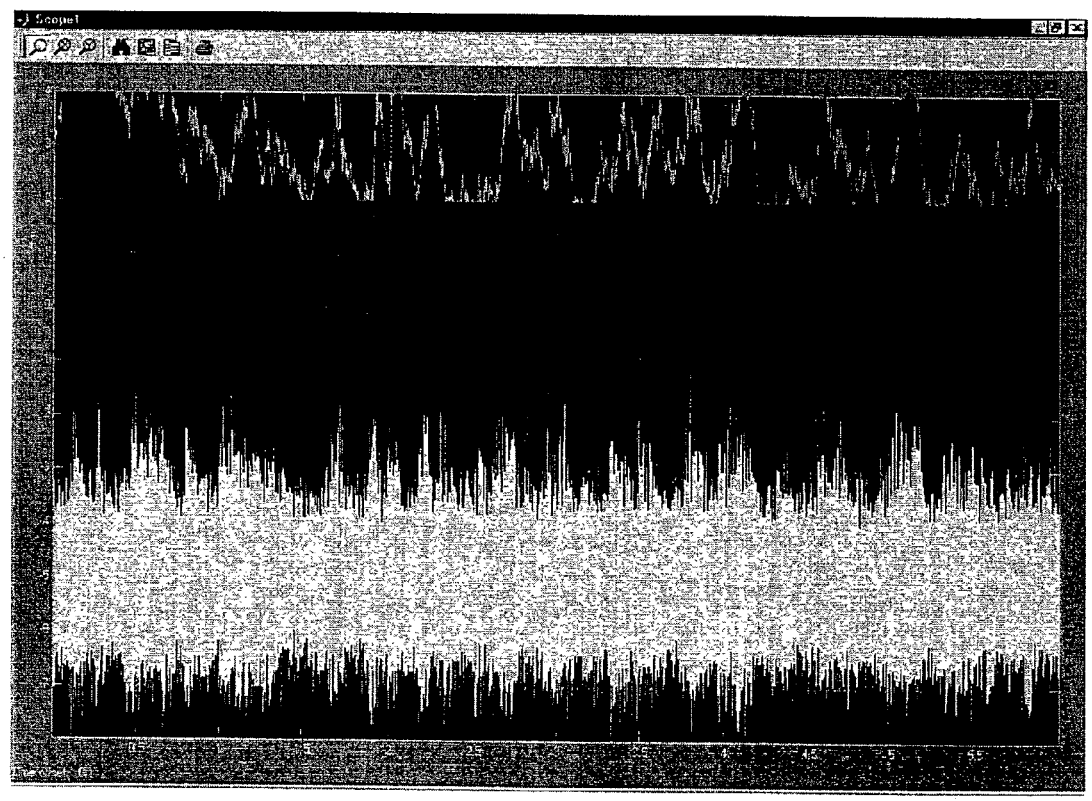

In FIG. 14, a voice signal, which is shown in the middle section, is superposed with a strong interference, with the summary signal which is shown below in a bright way. In the upper range, the evaluation index n is entered which has been determined according to the circuit of FIG. 11.

It is directly clear that a value n>3 allows concluding with virtual certainty the presence of speech, whereas n<3 indicates the absence of a voice signal. In this way it is possible to optimize the amplification and the signal processing. In the simplest of cases the amplification is reduced by a predetermined amount in the case of the absence of a voice signal.

Figure 15:
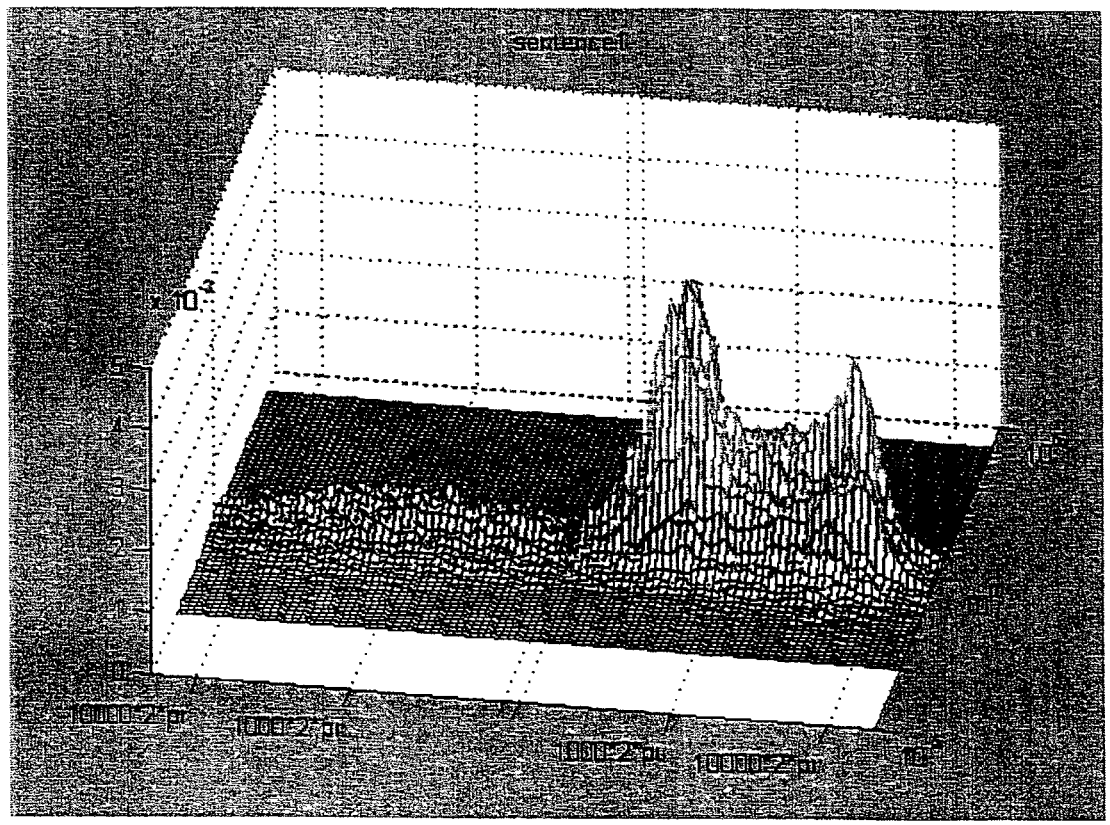
FIG. 15 shows a three-dimensional diagram in an axonometric view which represents a characteristic diagram for the probability density of instant amplitude and instant frequency for speech.

FIG. 15 shows a three-dimensional illustration of the probability density of instant amplitude and instant radian frequency for a voice signal. The instant radian frequency assumes both positive as well as negative values. The range between $-200\pi$ and $200\pi$ has been omitted in the illustration because this range is irrelevant for the analysis. Signals in this frequency range, however, can have a high energy, especially in the case of plosives, which under certain circumstances may impair the calculation.

From FIG. 15 a two-hill structure is shown which is typical for speech, meaning that there are two local maximums 50 and 51 in the characteristics. This is also shown in the contour line illustration of FIG. 16.

Figure 16:
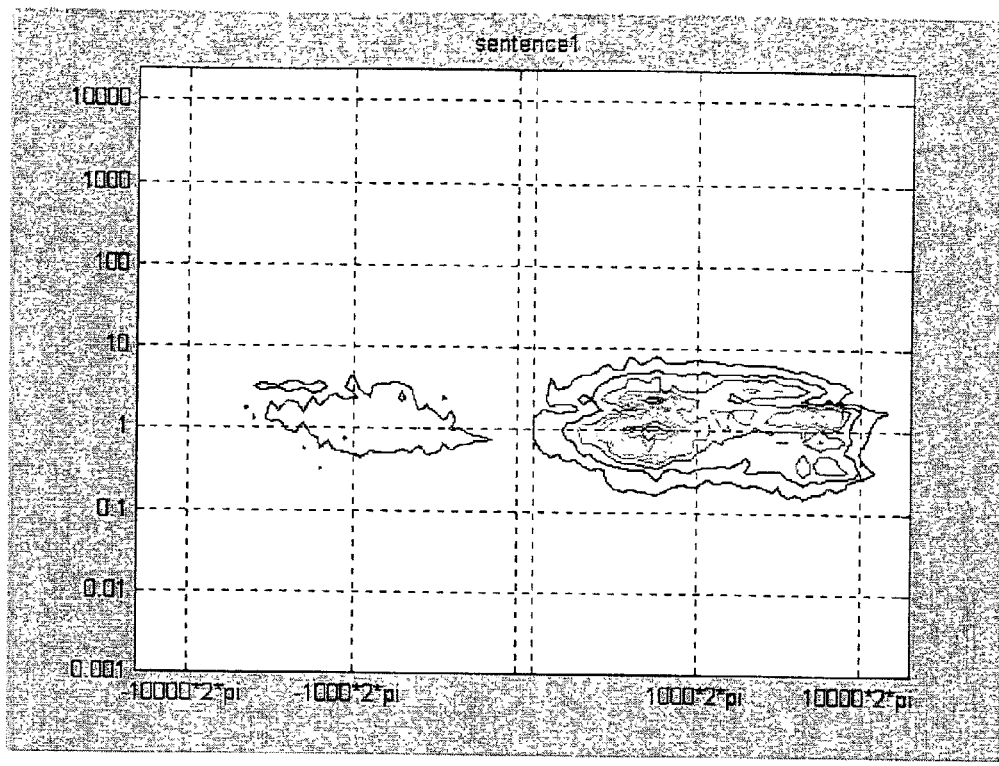
FIG. 16 shows the characteristic diagram of FIG. 15 in a contour line representation.
Figure 17:
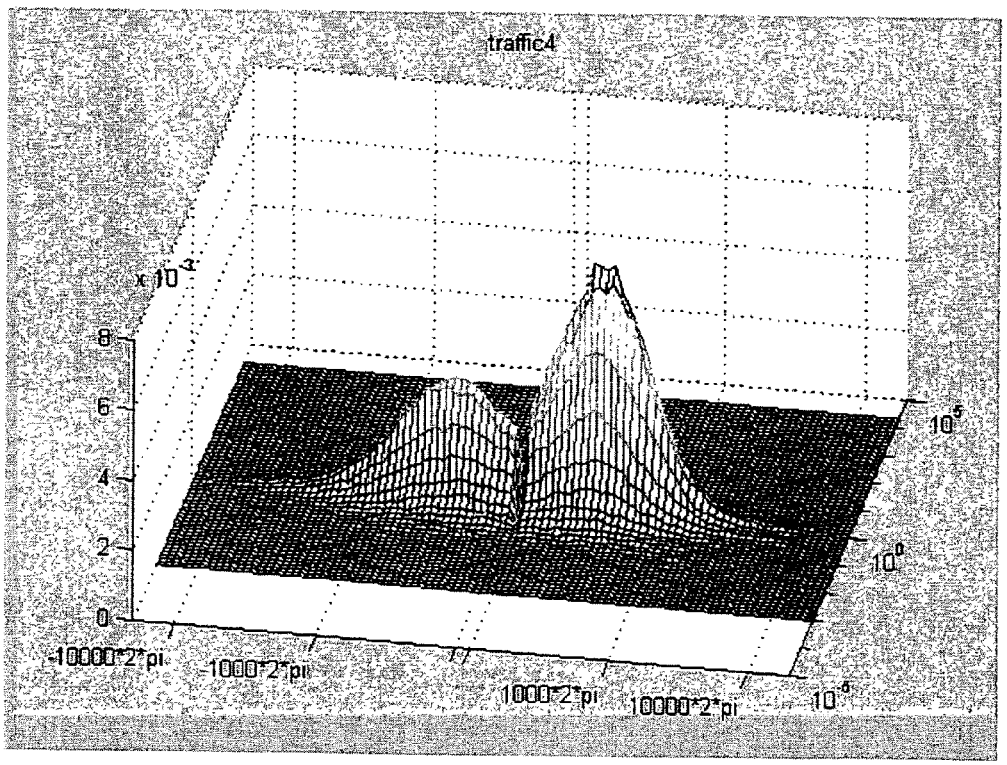
FIG. 17 shows a diagram which is analogous to FIG. 15 for interfering signals.
Figure 18:
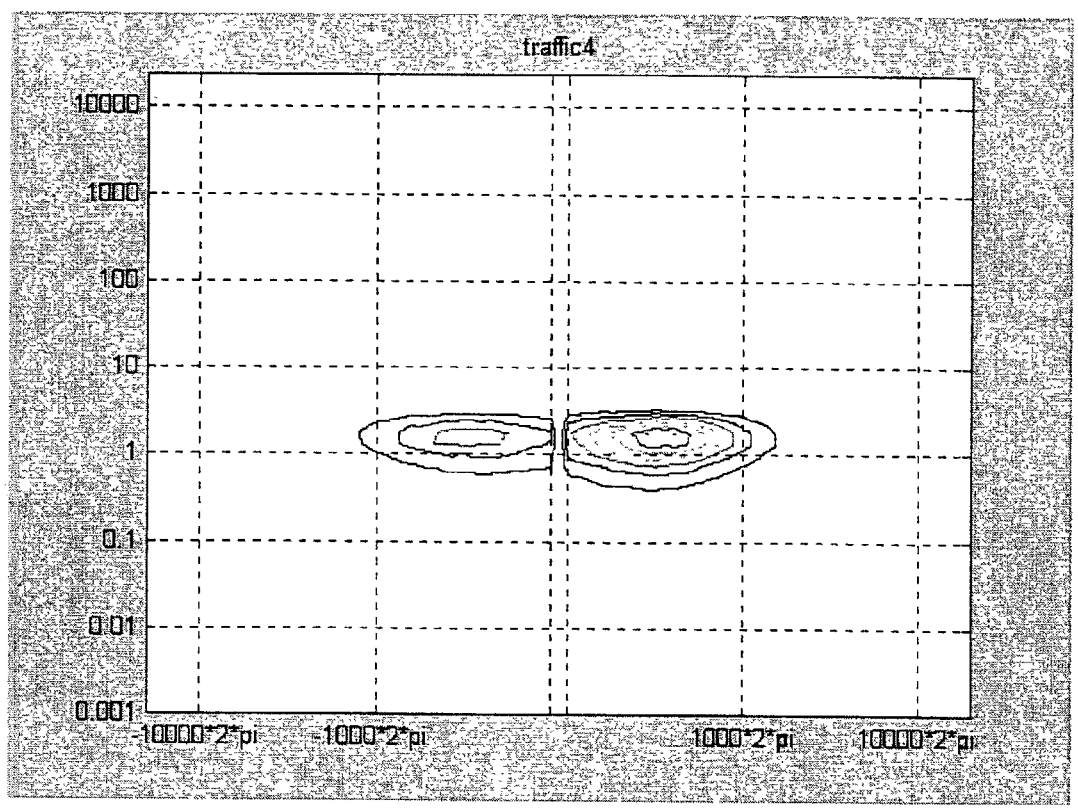
FIG. 18 shows the diagram of the characteristic diagram in FIG. 17 in a contour line representation.

FIGS. 17 and 18 correspond to FIGS. 15 and 16, but for an interfering signal without any share of speech. In the positive range of the instant radian frequency there is only one hill.

Figure 19:
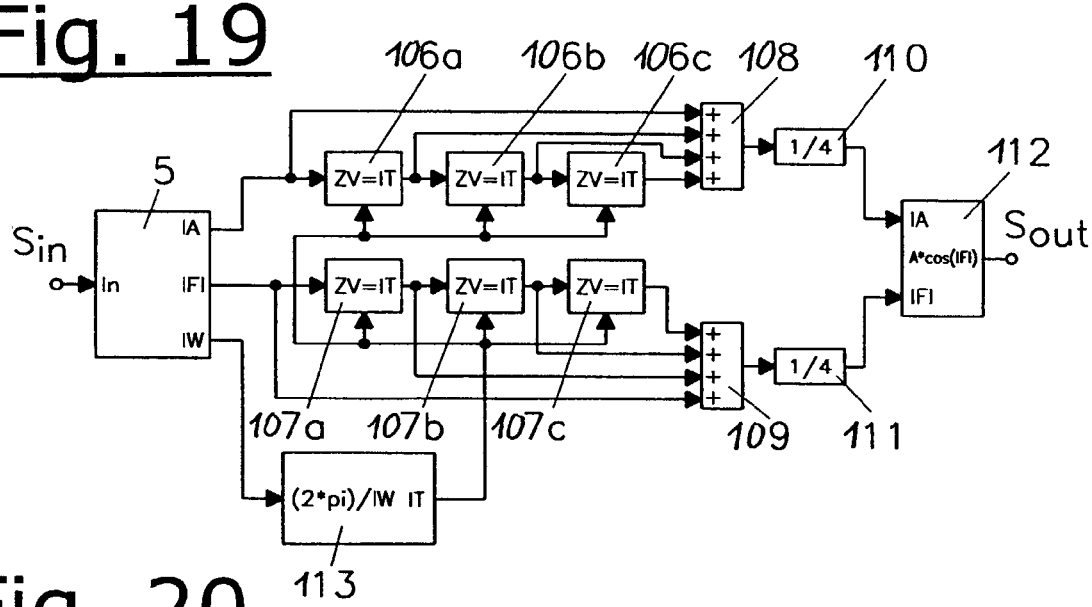
FIGS. 19 to 22 show block diagrams of different embodiments of the invention.

In the circuit of FIG. 19 the instant amplitude signal IA is delayed in a total of three delay elements 106a, 106b, 106c in order to obtain a single delayed instant amplitude signal $IA_{del1}$, a double delayed instant amplitude signal $IA_{del2}$ and triple delayed instant amplitude signal $IA_{del3}$. By adding IA, $IA_{del1}$, $IA_{del2}$ and $IA_{del3}$ in block 108 and division by four in block 110 an arithmetic mean of said signals IA, $IA_{del1}$, $IA_{del2}$ and $IA_{del3}$ is produced which is designated as amplitude mean value $IA_{av}$. In the above mean value formation it is not necessary to weight all signals IA, $IA_{del1}$, $IA_{del2}$ and $IA_{del3}$ the same. It is possible for example to weight the instant amplitude signal IA more strongly than the single delayed instant amplitude signal $IA_{del1}$ and this again more strongly than the double delayed instant amplitude signal $IA_{del2}$ and so on. In this way a weaker, but more robust noise suppression is achieved.

Similarly, the instant phase signal IFI is delayed in a total of three delay elements 107a, 107b, 107c in order to obtain a single delayed instant phase signal $IFI_{del1}$, a double delayed instant phase signal $IFI_{del2}$ and a triple delayed instant phase signal $IFI_{del3}$. A phase mean value $IFI_{av}$ is formed analogously in the blocks 109 and 111.

In block 12 the output signal $S_{out}$ is calculated according to the following formula (10).

$$S_{out}=IA_{av}\cdot\cos(IFI_{av}). \tag{10}$$

In block 113 the duration $t_{del}$ is calculated according to the formula (11) from the instant frequency signal IFR:

$$t_{del}=1/IFR=2\pi/IW, \tag{11}$$

with IW representative of the instant angular frequency signal which is the temporal derivation of the instant phase signal IFI.

The duration $t_{del}$ is therefore continually updated and sent to the delay elements 106a, 106b, 106c and 107a, 107b, 107c in order to perform the delay of the signals IA and IFI.

Figure 20:
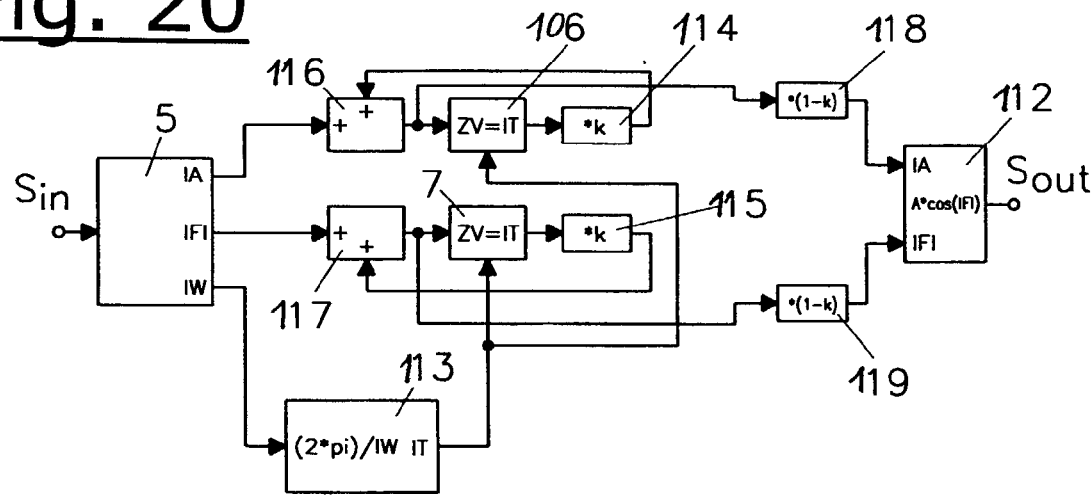

FIG. 20 shows an alternative embodiment in which there is only one delay element 106 and 107 each and in which the delayed signal $IA_{del}$ and $IFI_{del}$ is multiplied with a constant factor k and is fed back to an adder 116 and 117 which is situated upstream of the delay member 106 and 107 in order to obtain the signals $IA_{av}$ and $IFI_{av}$. In this way a kind of sliding average of the signals IA and IFI is formed with the signals delayed once and several times. For the constant factor k it applies that 0<k<1, with a higher value of k meaning a stronger weighting of the delayed signals. In blocks 118 and 119 the signals $IA_{av}$ and $IFI_{av}$ are normalized by multiplication with (1–k) and then supplied to block 112 in order to calculate the output signal $S_{out}$.

Figure 21:
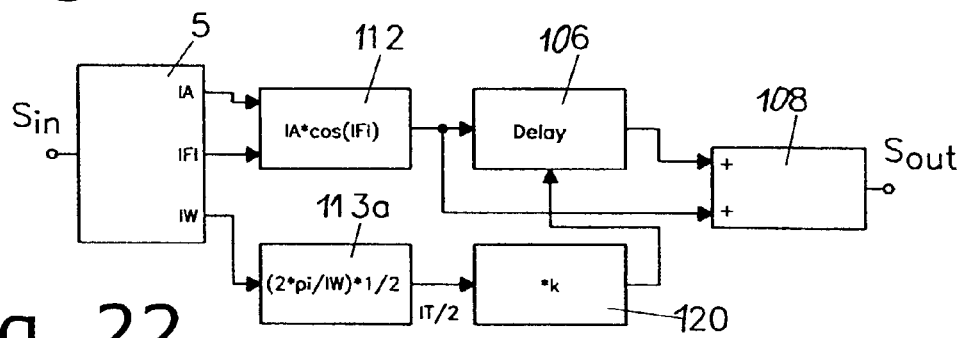

The circuit according to FIG. 21 shows the following differences from the circuit of FIG. 19:

At first a signal S is delayed in block 106 which corresponds directly to the input signal $S_{in}$ in order to obtain a delayed signal $S_{del}$. The input signal $S_{in}$ could be supplied directly to block 106. In the shown embodiment this is not the case because a signal S is delayed which is synthesized back from the analytical signal in block 112 according to the formula 10. This leads to the advantage that the delay caused by the Hilbert transformation in the calculation of the instant frequency signal IFR is compensated. Moreover, there is the possibility here to perform a signal processing in the frequency domain such as compression or expansion.

A further difference of this embodiment to those described above is that the signal S is delayed by a duration $t_{del}$ which corresponds to the reciprocal value of the double instant frequency IFR, as is illustrated in the formula (11a):

$$t_{del}=1/(2IFR)=\pi/IW, \tag{11a}$$

This means that the signal is delayed by only half the momentary period of oscillation. In block 120 the delayed signal $S_{del}$ can be multiplied with a constant factor k for which in this case $-1 \leq 0 \leq 1$ applies. As described above, for k=1 the fundamental tone and the harmonics with the triple, five-fold, etc. frequency are extinguished, whereas for k=–1 the harmonics with the double, four-fold, etc. frequency are extinguished.

Figure 22:
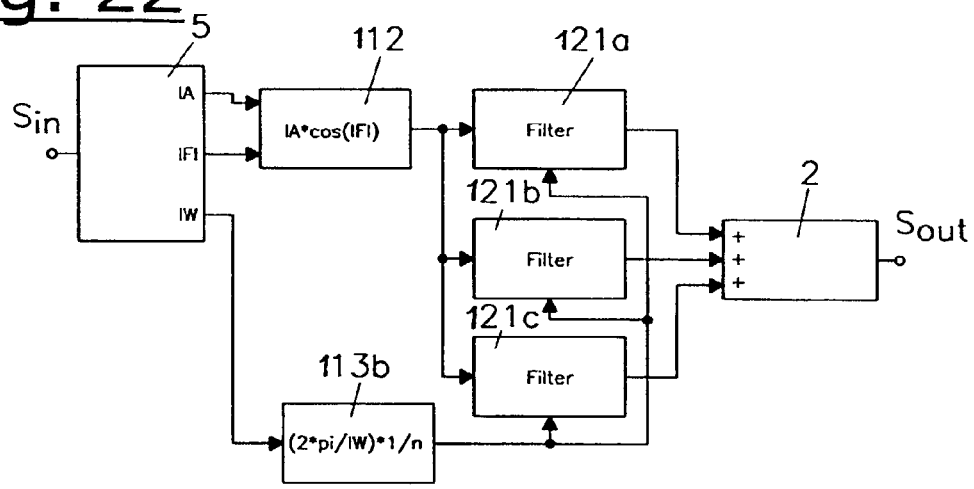

In the embodiment of FIG. 22 the signal corresponding to the input signal $S_{in}$ is supplied parallel to the filters 121a, 121b, 121c which correspond to a combination of the blocks 106 and 108 of FIG. 21. In block 113b the values for the duration $t_{del}$ are calculated which correspond to the respective reciprocal value of the single integral multiple of the instant frequency IFR, as is shown in the formula (11b):

$$t_{del}=1/(nIFR)=2\pi/(nIW), \tag{11b}$$

with n=1, 2, 3 . . . applying. In this way it is possible to extract individual harmonics in a purposeful way from the signal S and to compose the same in an adder 122 into an output signal $S_{out}$.

Figure 23:
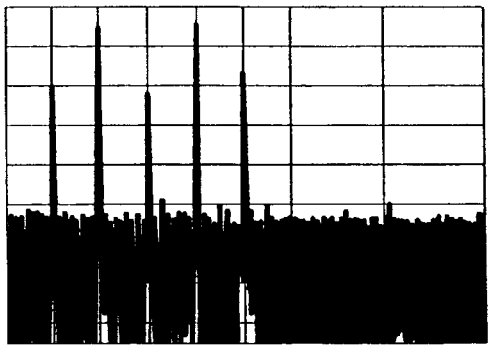
FIGS. 23 and 24 show diagrams representing a noise-infested input signal and output signal which has been gained with the method in accordance with the invention.

FIG. 23 shows a spectrum of a noise-infested signal. The harmonic components are clearly shown as peaks.

Figure 24:
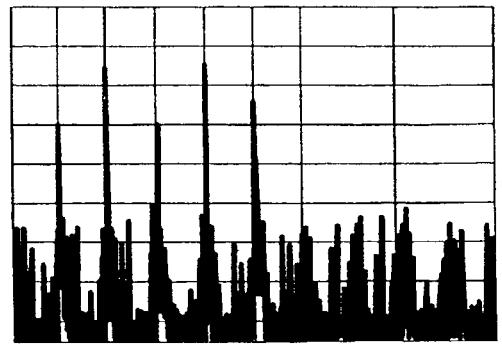

After performing the method in accordance with the invention, a signal with a spectrum according to FIG. 24 is achieved. It can be clearly recognized that the noise components are considerably reduced, thus respectively improving the signal-to-noise ratio.

What is claimed is:

1. A method for suppressing noise interference with the following steps:
    gaining of an analytical signal from an input signal ($S_{in}$);
    calculation of an instant amplitude signal (IA) from the analytical signal;
    calculation of an instant phase signal (IFI) from the analytical signal;
    non-linear modification of the instant amplitude signal (IA) into a modified instant amplitude signal ($IA_{mod}$);
    linkage of the modified instant amplitude signal ($IA_{mod}$) with the instant phase signal (IFI) into an output signal ($S_{out}$),
    wherein the non-linear modification of the instant amplitude signal (IA) is carried out as a result of an evaluation of the input signal ($S_{in}$), and
    wherein the evaluation is performed as a result of an evaluation function which is calculated from the instant amplitude signal (IA) and an instant frequency signal (IFR) gained from the temporal derivative of the instant phase signal (IFI) in order to obtain an evaluation index (n).

2. A method according to claim 1, wherein the non-linear modification of the instant amplitude signal (IA) is an expansion.

3. A method according to claim 1, wherein the calculation of the evaluation function is performed by the following steps:
    non-linear modification of the instant amplitude signal (IA) into a modified instant amplitude signal ($IA_{mod}$);
    non-linear modification of the instant frequency signal (IFR) into a modified instant frequency signal ($IFR_{mod}$);
    calculation of the evaluation function from the ratio of the modified instant amplitude signal ($IA_{mod}$) to the modified instant frequency signal ($IFR_{mod}$) in order to obtain the evaluation index (n).

4. A method according to claim 1, wherein the input signal ($S_{in}$) is first divided into several frequency bands, the signal of each frequency band is subjected to the method of claim 1 and output signals ($S_{out1}$, $S_{out2}$, $S_{out3}$) of the individual frequency bands are added up to an overall output signal ($S_{out}$).

5. A method for suppressing noise interference with the following steps:
    gaining of an analytical signal from an input signal ($S_{in}$);
    calculation of an instant amplitude signal (IA) from the analytical signal;
    calculation of an instant phase signal (IFI) from the analytical signal;
    non-linear modification of the instant amplitude signal (IA) into a modified instant amplitude signal ($IA_{mod}$);
    linkage of the modified instant amplitude signal ($IA_{mod}$) with the instant phase signal (IFI) into an output signal ($S_{out}$),
    wherein the non-linear modification of the instant amplitude signal (IA) is carried out as a result of an evaluation of the input signal ($S_{in}$), and
    wherein a first partial evaluation index ($n_1$) is formed from the instant amplitude signal (IA) and the instant frequency signal (IFR), a second partial evaluation index ($n_2$) is formed from a temporal derivative of the instant amplitude signals (IA) and a temporal derivative of the instant frequency signal (IFR) and the first and second partial evaluation indexes ($n_1$, $n_2$) are substantially additively linked in order to calculate the evaluation index (n).

6. A method according to claim 5, wherein the calculation of the first partial evaluation function is performed by the following steps:
    non-linear modification of the instant amplitude signal (IA) into a modified instant amplitude signal ($IA_{mod}$);

non-linear modification of the instant frequency signal (IFR) into a modified instant frequency signal (IFR$_{mod}$);

calculation of the first partial evaluation function from the ratio of the modified instant amplitude signal (IA$_{mod}$) to the modified instant frequency signal (IFR$_{mod}$) in order to obtain a first partial evaluation index (n$_1$).

7. A method according to claim 5, wherein the calculation of the second partial evaluation function is performed by the following steps:

non-linear modification of a temporal derivation of the instant amplitude signal (IA) into a modified differentiated instant amplitude signal (IA$_{diffmod}$);

non-linear modification of a temporal derivative of the instant frequency signal (IFR) into a modified differentiated instant frequency signal (IFI$_{diffmod}$);

calculation of the second partial evaluation function from the ratio of the modified differentiated instant amplitude signal (IA$_{diffmod}$) to the modified differentiated instant frequency signal (IFI$_{diffmod}$) in order to obtain a second partial evaluation index (n$_2$).

8. A method according to claim 5, wherein the second partial evaluation index (n$_2$) is weighted more strongly in the case of additive linkage than the first partial evaluation index (n$_1$).

9. A method for suppressing noise interference with the following steps:

gaining of an analytical signal from an input signal (S$_{in}$);

calculation of an instant amplitude signal (IA) from the analytical signal;

calculation of an instant phase signal (IFI) from the analytical signal;

formation of an integrated instant amplitude signal (IA$_{int}$) as a temporal mean value of the instant amplitude signal (IA);

formation of an integrated instant phase signal (IFI$_{int}$), with a temporal derivative of the instant phase signal (IFI) being formed and the result being temporally averaged and integrated;

formation of a delayed instant amplitude signal (IA$_{del}$) by delaying the instant amplitude signal (IA) by a delay time which corresponds to the delay by the mean value formation of the instant amplitude signal (IA);

formation of a delayed instant phase signal (IFI$_{del}$) by delaying the instant phase signal (IFI) by a delay time which corresponds to the delay by the mean value formation of the instant phase signal (IFI);

linkage of the integrated instant amplitude signal (IA$_{int}$) with the integrated instant phase signal (IFI$_{int}$) into an integrated output signal(S$_{int}$); linkage of the delayed instant amplitude signal (IA$_{del}$) with the delayed instant phase signal (IFI$_{del}$) into a delayed output signal (S$_{del}$);

linkage of the integrated output signal (S$_{int}$) with the delayed output signal (S$_{del}$).

10. A method according to claim 9, wherein the linkage of the integrated output signal with the delayed output signal is performed by subtraction of the integrated output signal multiplied with a factor from the delayed output signal.

11. A method according to claim 9, wherein the factor lies between 0 and 1 and is determined from the ratio of the signal strength of the integrated output signal (S$_{int}$) to the delayed output signal (S$_{del}$).

12. A method for suppressing noise interference with the following steps:

Gaining of an analytical signal from an input signal (S$_{in}$) containing noise interference;

Calculation of an instant phase signal (IFI) from the analytical signal;

Calculation of an instant frequency signal (IFR) as a temporal derivative of the instant phase signal (IFI) divided by 2Π;

Formation of a single delayed signal (S$_{del}$, IA$_{del}$, IFI$_{del}$; S$_{del1}$, IA$_{del1}$, IFI$_{del1}$) by delaying a signal (S, IA, IFI) from the group containing the input signal and the signals derived therefrom in order to obtain a duration (t$_{del}$) corresponding to the reciprocal value of a single integral multiple of the instant frequency signal (IFR);

Formation of a signal mean value (S$_{av}$, IA$_{av}$, IFI$_{av}$) from the signal (S, IA, IFI) and the single delayed signal (S$_{del}$, IA$_{del}$, IFI$_{del}$; S$_{del1}$, IA$_{del1}$, IFI$_{del1}$) in order to obtain an output signal (S$_{out}$) in which the noise interference is suppressed.

13. A method according to claim 12, wherein furthermore multiple delayed signals (S$_{del2}$, IA$_{del2}$, IFI$_{del2}$; S$_{del3}$, IA$_{del3}$, IFI$_{del3}$) are formed such that the signal (S, IA, IFI) is delayed several times successively by a duration (t$_{del}$) corresponding to the reciprocal value of a single integral multiple of the instant frequency signal (IFR), and the signal mean value (S$_{av}$, IA$_{av}$, IFI$_{av}$) is formed from the signal (S, IA, IFI) and the single and multiple delayed signals (S$_{del1}$, IA$_{del1}$, IFI$_{del1}$; S$_{del2}$, IA$_{del2}$, IFI$_{del2}$; S$_{del3}$, IA$_{del3}$, IFI$_{del3}$).

14. A method according to claim 12, wherein the single delayed signal (S$_{del}$, IA$_{del}$, IFI$_{del}$; S$_{del1}$, IA$_{del1}$, IFI$_{del1}$) is gained by delaying the signal (S, IA, IFI) by a duration (t$_{del}$) corresponding to the reciprocal value of the instant frequency signal (IFR).

15. A method according to claim 12, characterized by the following steps:

Gaining of an analytical signal from an input signal (S$_{in}$);

Calculation of an instant amplitude signal (IA) from the analytical signal;

Calculation of an instant frequency signal (IFR) as a temporal derivative of the instant phase signal (IFI) divided by 2Π;

Formation of a single delayed instant amplitude signal (IA$_{del}$; IA$_{del1}$) by delaying the instant amplitude signal (IA) by a duration (t$_{del}$) corresponding to the reciprocal value of a single integral multiple of the instant frequency signal (IFR);

Formation of a single delayed instant phase signal (IFI$_{del}$; IFI$_{del1}$) by delaying the instant phase signal (IFI) by the duration (t$_{del}$) corresponding to the reciprocal value of a single integral multiple of the instant frequency signal (IFR);

Formation of an amplitude mean value (IA$_{av}$) from the instant amplitude signal (IA) and the single delayed instant amplitude signal (IA$_{del}$; IA$_{del1}$);

Formation of a phase mean value (IFI$_{av}$) from the instant phase signal (IFI) and the single delayed instant phase signal (IFI$_{del}$; IFI$_{del1}$);

Linkage of the amplitude mean value (IA$_{av}$) with the phase mean value (IFI$_{av}$) into an output signal (S$_{out}$) in which the noise interference is suppressed.

16. A method according to claim 15, wherein furthermore multiple delayed instant amplitude signals (IA$_{del2}$; IA$_{del3}$) are formed such that the instant amplitude signal (IA) is delayed several times successively by a duration (t$_{del}$) corresponding to the reciprocal value of a single integral multiple of the instant frequency signal (IFR), multiple delayed instant phase signals (IFI$_{del2}$; IFI$_{del3}$) are formed such that the instant phase signal (IFI) is delayed several times successively by a duration (t$_{del}$) corresponding to the reciprocal value of a single integral multiple of the instant frequency signal (IFR), the amplitude mean value ($IA_{av}$) is formed from the instant amplitude signal (IA) and the single and multiple delayed instant amplitude signals ($IA_{del}$; $IA_{del1}$; $IA_{del2}$; $IA_{del3}$) and the phase mean value ($IFI_{av}$) is formed from the instant phase signal (IFI) and the single and multiple delayed instant phase signals ($IFI_{del}$; $IFI_{del1}$; $IFI_{del2}$; $IFI_{del3}$).

17. A method according to claim 15, wherein the amplitude mean value ($IA_{av}$) is gained such that the single delayed instant amplitude signal ($IA_{del}$) which is multiplied with a constant factor (k) is added to the instant amplitude signal (IA) and the phase mean value ($IFI_{av}$) is gained such that the single delayed instant phase signal ($IFI_{del}$) which is multiplied with a constant factor (k) is added to the instant phase signal (IFI).

18. A method according to claim 15, wherein the single delayed instant amplitude signal ($IA_{del}$; $IA_{del1}$) is gained by delaying the instant amplitude signal (IA) by a duration ($t_{del}$) corresponding to the reciprocal value of the instant frequency signal (IFR).

19. A method according to claim 15, wherein the single delayed instant phase signal ($IFI_{del}$; $IFI_{del1}$) is gained by delaying the instant phase signal (IFI) by a duration ($t_{del}$) corresponding to the reciprocal value of the instant frequency signal (IFR).

20. A method according to claim 15, wherein the single delayed instant amplitude signal ($IA_{del}$; $IA_{del1}$) is gained by delaying the instant amplitude signal (IA) by a duration ($t_{del}$) corresponding to half the reciprocal value of the instant frequency signal (IFR).

21. A method according to claim 15, wherein the single delayed instant phase signal ($IFI_{del}$; $IFI_{del1}$) is gained by delaying the instant phase signal (IFI) by a duration ($t_{del}$) corresponding to half the reciprocal value of the instant frequency signal (IFR).

22. A method according to claim 15, wherein several signal mean values are gained parallel with respect to each other which are combined into an output signal.

23. A method according to claim 12, wherein the instant frequency signal or the duration ($t_{del}$) corresponding to the reciprocal value of a single integral multiple of the instant frequency signal are temporally averaged prior to performing the delays.

24. A method for recognizing the presence of voice signals with the following steps:
  Gaining of an analytical signal from an input signal ($S_{in}$);
  Calculation of an instant amplitude signal (IA) from the analytical signal;
  Calculation of an instant phase signal (IFI) from the analytical signal;
  Calculation of an instant frequency signal (IFR) from the temporal derivative of the instant phase signal (IFI);
  Calculation of an evaluation function from the instant amplitude signal (IA) and the instant frequency signal (IFR) in order to obtain an evaluation index (n).

25. A method according to claim 24, wherein a two-dimensional characteristic diagram is produced first in which the probability density for a useful signal in the form of speech is stated as a function of the instant amplitude signal (IA) and the instant frequency signal and the evaluation function is determined on the basis of said characteristic diagram.

26. A method according to claim 25, wherein two non-interrelated ranges are defined in the characteristic diagram which are associated with the useful signal and the remaining range of the characteristic diagram is associated to the interfering signal.

27. A method according to claim 24, wherein the input signal ($S_{in}$) is subjected first to a normalization of the amplitude.

* * * * *